United States Patent
Revah et al.

(10) Patent No.: US 10,205,658 B1
(45) Date of Patent: Feb. 12, 2019

(54) REDUCING SIZE OF POLICY DATABASES USING BIDIRECTIONAL RULES

(71) Applicant: Marvell Israel (M.I.S.L) Ltd., Yokneam (IL)

(72) Inventors: Yoram Revah, Akko (IL); Tal Mizrahi, Haifa (IL); David Melman, Halutz (IL)

(73) Assignee: MARVELL ISRAEL (M.I.S.L) LTD., Yokneam (IL)

( * ) Notice: Subject to any disclaimer, the term of this patent is extended or adjusted under 35 U.S.C. 154(b) by 213 days.

(21) Appl. No.: 14/990,506

(22) Filed: Jan. 7, 2016

Related U.S. Application Data

(60) Provisional application No. 62/156,066, filed on May 1, 2015, provisional application No. 62/101,206, filed on Jan. 8, 2015.

(51) Int. Cl.
*H04L 12/741* (2013.01)
*H04L 12/813* (2013.01)

(52) U.S. Cl.
CPC .............. *H04L 45/74* (2013.01); *H04L 47/20* (2013.01)

(58) Field of Classification Search
CPC ..... H04L 45/74; H04L 45/741; H04L 45/742; H04L 45/745; H04L 45/7453; H04L 45/7457; H04L 45/748; H04L 47/20
See application file for complete search history.

(56) References Cited

U.S. PATENT DOCUMENTS

| | | | | |
|---|---|---|---|---|
| 6,519,636 | B2 * | 2/2003 | Engel | H04L 47/10 370/229 |
| 8,195,960 | B2 * | 6/2012 | Hirai | G06F 21/10 713/193 |
| 9,667,551 | B2 * | 5/2017 | Edsall | H04L 41/0893 |
| 2013/0080612 | A1 * | 3/2013 | Armstrong | H04L 45/302 709/223 |
| 2017/0250917 | A1 * | 8/2017 | Ruckstuhl | H04L 47/2441 |

\* cited by examiner

*Primary Examiner* — Asad M Nawaz
*Assistant Examiner* — Thomas R Cairns

(57) ABSTRACT

Aspects of the disclosure provide a method for processing packets in a network device. The method can include populating a policy database with one or more bidirectional rules that are to be selectively applied in a packet processing operation. Ones of the bidirectional rules can include at least: a first address field populated with a first value corresponding to a source address for first packet flow that is traversing a network in a first direction and to a destination address for second packet flow that is traversing the network in a second direction different from the first direction, a second address field populated with a second value, and an action that is applicable to packet flow having a respective source address and destination address corresponding to the first values stored in the first address field and to the second values stored in the second address field.

14 Claims, 6 Drawing Sheets

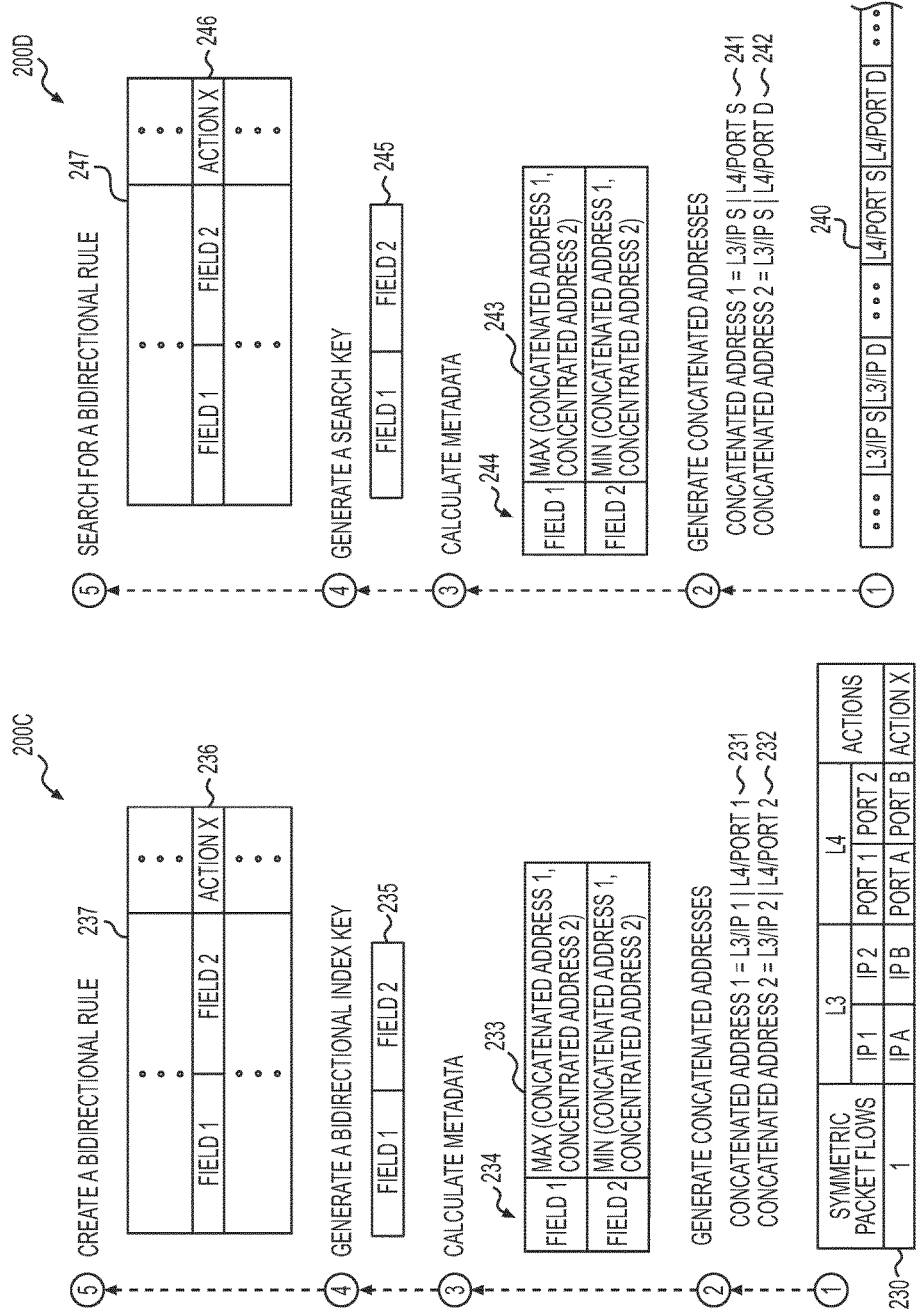

ized Application No. 62/101,206, "Normalized ACL Entry" filed on Jan. 8, 2015, which is incorporated herein by reference in its entirety. This present disclosure also claims the benefit of U.S. Provisional Application No. 62/156,066, "Normalized ACL Entry" filed on May 1, 2015, which is incorporated herein by reference in its entirety.

REDUCING SIZE OF POLICY DATABASES USING BIDIRECTIONAL RULES

INCORPORATION BY REFERENCE

This present disclosure claims the benefit of U.S. Provisional Application No. 62/101,206, "Normalized ACL Entry" filed on Jan. 8, 2015, which is incorporated herein by reference in its entirety. This present disclosure also claims the benefit of U.S. Provisional Application No. 62/156,066, "Normalized ACL Entry" filed on May 1, 2015, which is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Network devices, such as network switches, routers, and the like, often employ policy databases that store policy rules defined for different packet flows. The policy rules are associated with a set of actions to be executed upon packets entering the network devices. The network devices often perform searches/lookups in the policy database to find a policy rule that matches a packet.

SUMMARY

Aspects of the disclosure provide a method for processing packets in a network device. The method can include populating a policy database of the network device with one or more bidirectional rules that are to be selectively applied in a packet processing operation to packets received at the network device. Ones of the bidirectional rules can include at least: (i) a first address field populated with a first value corresponding to a source address for first packet flow that is traversing a network in a first direction and to a destination address for second packet flow that is traversing the network in a second direction different from the first direction, (ii) a second address field populated with a second value corresponding to a destination address for the first packet flow that is traversing the network in the first direction and to a source address for the second packet flow that is traversing the network in the second direction, and (iii) an action or a link to an action that is applicable to packet flow having a respective source address and destination address corresponding to the first values stored in the first address field and to the second values stored in the second address field.

The method further includes receiving, at the network device, a packet including a packet header having a source address field containing a source address for the packet and a destination address field containing a destination address for the packet, generating a search key for the packet based on the respective source address and destination address of the packet, searching the policy database with the search key to identify one or more bidirectional rules matching the respective source address and destination address of the packet, and performing an action on the packet based on a selected matching bidirectional rule.

In an embodiment of the method, the ones of the bidirectional rules includes one or more pairs of address fields. Each pair of address fields is populated with a different pair of values. One of the different pair of values corresponds to one of multiple source addresses of the first packet flow and to one of multiple destination addresses of the second packet flow, and the other one of the different pair of values corresponds to one of multiple destination addresses of the first packet flow and to one of multiple source addresses of the second packet flow.

In another embodiment of the method, at least one pair of address fields corresponds to one of a layer 2 protocol, a layer 3 protocol, and a layer 4 protocol, and the one pair of address fields are populated with a pair of values corresponding to a source address and a destination address corresponding to the one of the layer 2 protocol, the layer 3 protocol, and the layer 4 protocol.

In one embodiment of the method, populating the policy database includes formulating bidirectional rules according to a canon, such that a first search key for a first packet having a first network address as a source address and a second network address as a destination address will match a same bidirectional rule as a second search key for a second packet having the first network address as destination address and the second network address as source address.

In an example, formulating bidirectional rules according to a canon includes calculating metadata including at least a pair of metadata fields based on the source address and destination address of the first packet flow, and populating the first address field and the second address field with values contained in the pair of metadata fields. In a further example, one of the source address and the destination address of the first packet flow that has a higher numerical value than the other one of the source address and the destination address of the first packet flow is included in one of the pair of metadata fields, and the other one of the source address and the destination address of the first packet flow that has a lower numerical value is included in another one of the pair of metadata fields. In a still further example, generating a search key for the packet includes generating the search key according to the canon for formulating the bidirectional rules.

In a further embodiment of the method, populating the policy database includes populating the first address field using one of a source address and a destination address of the first packet flow or the second packet flow that has a higher numerical value than the other one of the source address and the destination address, and populating the second address field using one of a source address and a corresponding destination address of the first packet flow or the second packet flow that has a smaller numerical value than the other one of the source address and the corresponding destination address.

In an embodiment of the method, the policy database is stored in a ternary content-addressable memory (TCAM) device or an exact match memory device.

Aspects of the disclosure provide a network device. The network device includes a control processor configured to populate a policy database of a network device with one or more bidirectional rules that are to be selectively applied in a packet processing operation to packets received at the network device. Ones of the bidirectional rules including at least: (i) a first address field populated with a first value corresponding to a source address for first packet flow that is traversing a network in a first direction and to a destination address for second packet flow that is traversing the network in a second direction different from the first direction, (ii) a second address field populated with a second value corresponding to a destination address for the first packet flow that is traversing the network in the first direction and to a source address for the second packet flow that is traversing the network in the second direction, and (iii) an action or a link to an action that is applicable to packet flow having a respective source address and destination address corresponding to the first values stored in the first address field and to the second values stored in the second address field.

The network device further includes a packet processor. The packet processor includes a network interface configured to receive a packet at the network device, the packet including a packet header having a source address field containing a source address for the packet and a destination address field containing a destination address for the packet, a key generator configured to generate a search key for the packet based on the respective source address and destination address of the packet, a search engine configured to search the policy database with the search key to identify one or more bidirectional rules matching the respective source address and destination address of the packet, and a packet processing unit configured to select a matching bidirectional and to perform an action on the packet based on the selected bidirectional rule.

BRIEF DESCRIPTION OF THE DRAWINGS

Various embodiments of this disclosure that are proposed as examples will be described in detail with reference to the following figures, wherein like numerals reference like elements, and wherein:

FIG. 2C shows a third process of populating a policy database according to an embodiment of the disclosure;

FIG. 2D shows a fourth process for searching a policy database according to an embodiment of the disclosure;

DETAILED DESCRIPTION OF EMBODIMENTS

Figure 1:
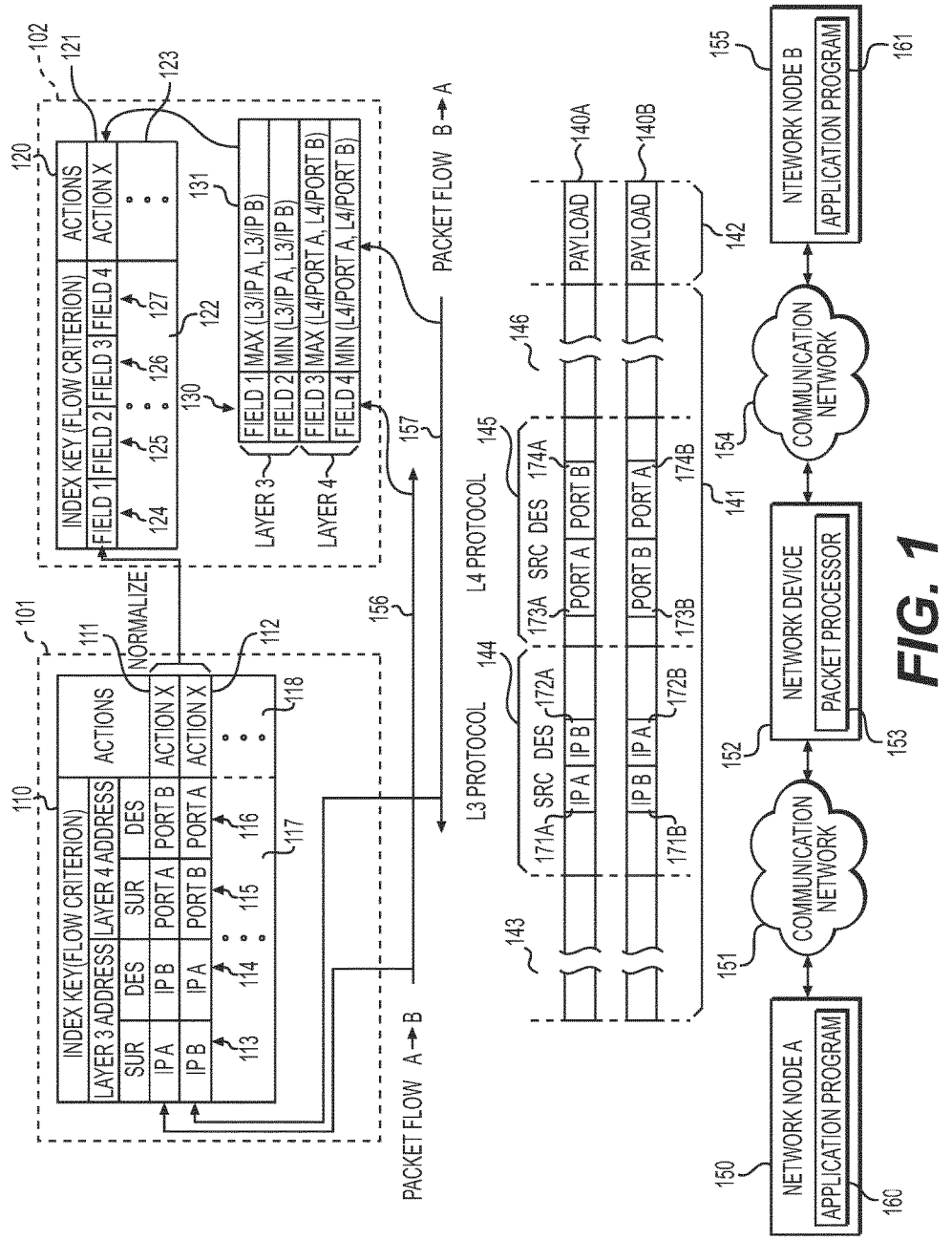
FIG. 1 shows a block diagram of a communication system that includes a technique for reducing a size of a policy database used in a network device according to an embodiment of the disclosure.

FIG. 1 shows a block diagram of a communication system that includes a technique for reducing a size of a policy database used in a network device 152 according to an embodiment of the disclosure. A policy database is also referred to as access control lists (ACL), lookup tables, flow tables, and the like, in different application contexts. In an example, a policy database contains numerous policy rules for enforcing different policies on different packet flows. The policies include security policy, quality of service (QoS) policy, traffic management policy, and the like.

Generally, a packet flow is defined as a stream of packets of a same packet type, for example, having the same source and destination. Thus, a packet flow is associated with a criterion used for determine whether a packet belongs to the packet flow. The criterion includes information in a packet belonging to the packet flow, for example, information in specific header fields of a packet header of the packet, e.g.,
layer 2 (L2), layer 3 (L3) or layer 4 (L4) source addresses and destination addresses. The terms "packet" and "frame" are usually used with layer 3 protocols and layer 2 protocols, respectively, based on the Open Systems Interconnection (OSI) model in the field of networking, but they are used interchangeably for ease of explanation in the context described in this disclosure.

Each policy rule in the policy database includes, for example, an index key section and an action section. The index key section includes an index key representing a criterion associated with a packet flow. When a packet enters a network device, such as a switch, bridge or router, the network device performs a search in the policy database to find a policy rule that matches the packet. Specifically, information in specific header fields of the packet header of the packet is compared with a criterion represented by an index key of each policy rule. When a matching policy rule is found, an action associated with the matching policy rule is executed on the packet.

In various embodiments, the search operation in a network device can be implemented using software employing various algorithms, or using hardware, such as Ternary Content Addressable Memory (TCAM) or Content Addressable Memory (CAM). While TCAMs can facilitate faster search operation than other techniques, in various embodiments, TCAMs can be relatively costly, as well as consume more power and require more chip space. When TCAM is employed, a smaller policy database can be preferred to reduce an amount of TCAM resources that are required. In conventional network devices policy rules are direction specific in the sense that a separate rule is applied to network traffic for a packet flows between two network nodes based on a direction of the direction of traffic. As a result, in some cases, even though functionally the same policy rule may be applied for all traffic between node A and node B, in conventional systems traffic from node A to node B is treated separately respective of traffic from node B to node A such that a separate policy rule is maintained for traffic in each direction. As a result, in conventional network devices, inasmuch as the bidirectional nature of some policy rules is not considered, the number rules stored in a policy data base is significantly larger than is actually needed.

FIG. 1 provides two examples 101 and 102 of populating policy databases in the network device 152. Each of the examples 101 and 102 represents a different approach for populating policy databases leading to different database sizes. In the first example 101, two policy rules 111 and 112 are created in a first policy database 110 for a first packet flow 156 from network node A 150 to network node B 155 and a second packet flow 157 from network node B 155 to network node A 150, respectively. In contrast, the second example 102 creates only a single policy rule 121 in a second policy database 120 for the two packet flows 156 and 157 between the two network nodes 150 and 155.

During operation, the network node A 150 and the network node B 155 transmit packets to each other in opposite directions. Specifically, the network node A 150 transmits packets via a first communication network 151 to a network device 152. The network device 152 includes a packet processor 153 in an embodiment. The packet processor 153 processes the received packets. For example, the packet processor searches for a policy rule matching a received packet in a policy database, such as the policy database 110 or the policy database 120, and performs an action associated with the policy rule found in the policy database. Subsequently, the packet processor 153 transmits the packets to the network node B 155 via a second communication network 154, in an embodiment. Similarly, the network node B 155 transmits packets to the network A 150 via the second communication network 154, the network device 152, and the first communication network 151. In various embodiments, the network nodes 150 and 155 can be the same type or different type of devices, such as a computer, a server, network switch, a router, a mobile device, and the like, and the communication networks 151 and 154 can include WLANs, wired-LANs, wireless cellular networks, Internet, and the like. It is to be understood that the structure of the network system shown in FIG. 1 is illustrative, and the scope of the disclosure are not limited to the structure of the network system shown in FIG. 1. For example, the network device 152 can be in various networks having various structures and including various network devices, and the network device 152 can be located in various locations in the various networks including the edge of the various networks. In addition, the policy databases can be included in any network devices in the various networks including the edge devices such as the network nodes 150 and 155.

Application programs in the two network nodes 150 and 155 communicate using multiple network protocols. Generally, the network protocols are organized into a protocol stack having multiple layers, for example, based on the Internet protocol suite or the Open Systems Interconnection model (OSI model). The network protocols operate in coordination to facilitate communications between the applications or functional elements. For example, Internet Protocol (IP) is a L3 protocol. IP provides routing service for upper layer protocols based on IP addresses. IP encapsulates data and IP addresses received from upper layers into a packet and transmits the packet through the Internet. The IP addresses include a source IP address and a destination IP address.

Transmission Control Protocol (TCP) is a L4 protocol. TCP provides control mechanisms for data streams between two application programs at two different network nodes. TCP receives data from an application program and encapsulates the data into a TCP datagram, and passes the TCP datagram to the Internet Protocol. In addition, TCP uses port numbers to identify the sending and receiving application programs thus providing multiplexing function for different application programs in a same network node. The sending and receiving application program each have an associated port number between 0-65535. TCP encapsulates the port numbers in the TCP datagram. The port numbers include a source port number corresponding to the sending application program, and a destination port number corresponding to the receiving application program. As a result, a packet generated from the IP and TCP in this example includes a combination of a L3 source IP address, a L4 source port number, a L3 destination IP address, and a L4 destination port number.

In FIG. 1, the packet flows 156 and 157 are between two application programs 160 and 161 located in the network node A 150 and the network node B 155, respectively, but being transmitted in opposite directions. The first packet flow 156 includes a first packet 140A, and the second packet flow 157 includes a second packet 140B. As shown, the first packet 140A includes a payload 142 and a packet header 141. The payload 142 includes data generated at the application program A 160. The packet header 141 includes multiple header sections 143-146 corresponding to different network protocols in different layers of the protocol stack described above. Each header section can include multiple header fields containing information associated with the corresponding network protocols. In addition, each header section can include a pair of source address and destination address corresponding to the network protocol associated with the each header section.

Specifically, the first packet 140A includes a L3 header section 144 and a L4 header section 145. In the first packet 140A, the L3 header section includes a L3 source IP address field 171A and a L3 destination IP address field 172A. The L3 source IP address field 171A contains an IP address IP A, and the L3 destination IP address field 172A contains an IP address IP B. In the first packet 140A, the L4 header section includes a L4 source port field 173A and a L4 destination port field 174A. The L4 source port field 173A includes a L4 source port number Port A, and the L4 destination port field 174A includes a L4 destination port number Port B.

The second packet 140B has a similar structure as the first packet 140A. However, the second packet 140B includes a L3 source IP address field 171B containing a L3 source IP address IP B, and a L3 destination IP address field 172B containing a L3 destination IP address IP A. The second packet 140B also includes a L4 source port field 173B containing a L4 source port number Port B, and a L4 destination port field 174B containing a L4 destination port number Port A.

The source addresses and the destination addresses corresponding to the L3/L4 network protocols in the two packets 140A and 140B exhibit a symmetric characteristic: the L3/L4 source addresses IP A and Port A for the first packet 140A are the L3/L4 destination addresses for the second packet 140B, while the L3/L4 destination addresses IP B and Port B for the first packet 140A are the L3/L4 destination addresses for the second packet 140B. Accordingly, the two packets 140A and 140B are referred to as a set of symmetric packets with respect to the L3/L4 protocols.

In this disclosure, a set of symmetric packets with respect to certain network protocols refers two groups of packets wherein source addresses corresponding to the certain network protocols in the first group of packets are destination addresses corresponding to the certain protocols in the second group of packets, and destination addresses corresponding to the certain network protocols in the first group of packets are source addresses corresponding to the certain protocols in the second group of packets. Subsequently, the two groups of packets of one set of symmetric packets are transmitted in opposite directions between two entities (e.g. two application programs) in two network nodes.

In FIG. 1, the packet flow 156 is defined based on the L3/L4 source and destination addresses in the packet header of the packet 140A, and the packet flow 157 is defined based on the L3/L4 source and destination addresses in the packet header of the packet 140B. Specifically, the packet flow 156 consists of packets having a L3 source IP address IP A, a L3 destination IP address IP B, a L4 source port number Port A, and a L4 destination port number Port B. Similarly, the packet flow 157 consists of packets having a L3 source IP address IP B, a L3 destination IP address IP A, a L4 source port number Port B, and a L4 destination port number Port A. Accordingly, the two packet flows 156 and 157 are referred to as a pair of symmetric packet flows with respect to the L3/L4 network protocols. In this disclosure, a pair of symmetric packet flows with respect to certain network protocols refers to two packet flows wherein a first packet flow consists of a first group of packets of a set of symmetric packets transmitted in one direction, and a second packet flow consists of a second group of packets of the set of symmetric packets transmitted in another direction.

In the first example 101 of populating a policy database, the first policy database 110 stores numerous policy rules, such as the policy rules 111 and 112. As shown, each policy rule includes an index key section 117 and an action section 118. In one example, the action section 118 contains one or more actions to be performed on packets matched to corresponding policy rule. In another example, the action section 118 contains a link (an address) pointing a memory where actions are stored. The index key section 117 includes an index key. The index key is associated with actions in the corresponding policy rule. The index key includes information representative of criteria for defining packet flows. In the FIG. 1 example, the index key section 117 of an entry (a policy rule) includes multiple fields 113-116. The multiple fields 113-116 includes a pair of a L3 source address field 113 and a L3 destination field 114, and a pair of a L4 source port number field 115 and a L4 destination port number field 116. In alternative examples, the index key section 117 may include address fields other than the fields 113-116 corresponding to network protocols other than L3/L4 network protocols. In addition, the index key section 117 may include fields containing non-address information.

In the first example 101 of populating a policy database, two policy rules 111 and 112 associated with a same action X are created for the pair of symmetric packet flows 156 and 157 with respect to L3/L4 network protocols. Specifically, the first policy rule 111 associated with the action X is created for the packet flow 156, and the second policy rule 112 also associated with the action X is created for the packet flow 157. As shown, in the first policy rule 111, the four address fields 113-116 (specifically, the L3 source address field 113, the L3 destination field 114, the L4 source port number field 115, and the L4 destination port number field 116) respectively contain IP address IP A, IP address IP B, port number Port A, and port number Port B. While in the second policy rule 112, the four address field 113-116 respectively contain IP address IP B, IP address IP A, port number Port B, and port number Port A.

It is apparent the source addresses and the destination addresses corresponding to the L3/L4 network protocols in the two policy rules 111-112 also exhibit a symmetric characteristic. Accordingly, the two policy rules 111-112 are referred to as a pair of symmetric rules. The pair of symmetric rules 111-112 corresponds to the pair of symmetric packet flows 156 and 157, and are associated with the same action X. Based on the symmetric characteristic of the pair of symmetric rules 111-112, the second example 102 of populating a policy database provides a technique for reducing a size of a policy database.

In the second example 102 of populating a policy database, the second policy database 120 includes numerous policy rules. Similar to policy rules in the policy database 110, each of the policy rules includes an index key section 122 and an action section 123. The action section 123 contains one or more actions to be performed on packets matched to corresponding policy rule, or a link pointing to the one or more actions stored in a memory. The index key section 122 includes an index key having multiple fields 124-127. The index key is associated with actions in the corresponding policy rule. The index key includes information representative of criteria for defining packet flows.

However, different from the example 101, in the example 102 of populating a policy database, only one policy rule 121 is defined for both of the pair of the symmetric packet flows 156 and 157 with respect to L3/L4 network protocols. In other words, the two policy rules 111-112 both associated with the action X previously defined for the two symmetric packets flows 156-157 are now normalized into a single policy rule 121 associated with the same action X. The policy rule 121 is applicable to both directions of the pair of the symmetric packet flows 156-157, thus the policy rule 121 is referred to as a bidirectional rule 121 for the pair of the symmetric packet flows 111-112 with respect to L3/L4 network protocols.

The bidirectional rule 121 is formulated according to a canon, in an embodiment. A canon refers to a predefined rule for generating an index key for a bidirectional rule when populating a policy database. The same canon is also used for generating a search key for searching the policy database when processing a packet in a network device. In the FIG. 1 example, the canon includes steps of calculating a set of metadata 130, and subsequently generating an index key based on the metadata 130.

As shown in the example 102, the metadata 130 is first calculated based on the source and destination addresses of the symmetric packet flows 156-157 using a metadata mapping table (MMT) 131. The metadata 130 includes multiple metadata fields 130, such as metadata field 1 to metadata field 4 as shown. Each of the multiple metadata fields 130 contains a network address. A MMT describes a method for determining a network address for a metadata field using Max and Min calculation formulas. Specifically, in order to determine a network address for a metadata field, numerical values of each pair of source and destination addresses corresponding to a network protocol are compared using the Max and Min calculation formulas in the MMT 131. Generally, source or destination network addresses corresponding to a network protocol, such as IP addresses and port numbers, are represented as a sequence of numbers. A numerical value of a network address refers to the value of a sequence of numbers corresponding to the network address.

In the FIG. 1 example, the pair of metadata field 1 and metadata field 2 corresponds to the L3 network protocol. Based on the comparison of the numerical values of network addresses, Field 1 stores a L3 IP address that is the one of the L3 source and destination IP addresses of the symmetric packet flows 156-157 that has a higher numerical value than the other one of the L3 source and destination IP addresses, while Field 2 stores a L3 IP address that is the one of the L3 source and destination IP addresses of the symmetric packet flows 156-157 that has a smaller numerical value than the other one of the L3 source and destination IP addresses, in an embodiment. Similarly, the pair of metadata field 3 and metadata field 4 corresponds to the L4 network protocol. Based on the comparison of the numerical values of network addresses, Field 3 stores a L4 IP address that is the one of the L4 source and destination IP addresses of the symmetric packet flows 156-157 that has a higher numerical value than the other one of the L4 source and destination IP addresses, while Field 4 stores a L4 IP address that is the one of the L4 source and destination IP addresses of the symmetric packet flows 156-157 that has a smaller numerical value than the other one of the L4 source and destination IP addresses, in an embodiment. As a result, the metadata 130 forms a canonized representation of the source addresses and destination addresses of the symmetric packet flows 156-157 regardless of the directions of the symmetric packet flows 156-157.

Next, after the metadata 130 has been determined, in an embodiment, the index key of the bidirectional rule 121, referred to as a bidirectional index key, is generated based on the metadata 130. Specifically, the index key in the index key section 122 of the bidirectional rule 121 includes multiple fields 124-127. The multiple fields 124-127 include a pair of L3 address fields 124 and 125, and a pair of L4 address fields 126 and 127. The address fields 124-127 are populated with the addresses stored in the metadata field 1, the metadata field 2, the metadata field 3, and the metadata field 4, respectively. As a result, each of the address fields 124-127 is populated with an address corresponding to a source address of one of the symmetric packet flows 156-157 transmitted in one direction and a destination address of another one of the symmetric flows 156-157 transmitted in another direction. Thereafter, the action X can be associated with the index key, irrespective of a direction of the corresponding flow, thus forming the bidirectional rule 121.

It is noted that, the canon for formulating the bidirectional rule 121 described above is only an example for explaining the process of formulating a bidirectional rule, and other canons including steps different from the above described canon is possible. For example, various hash functions can be used based on the metadata to generated hashed values used as index keys for formulating a policy entry. Generally, in order to formulate a bidirectional rule in a policy database to reduce size of the policy database, the bidirectional policy rule can be formulated according to a canon, such that a first search key for a first packet having a first set of network addresses as source addresses and a second set of network addresses as destination addresses matches a same bidirectional rule as a second search key for a second packet having the first set of network addresses as destination addresses and the second set of network addresses as source addresses.

It is further noted that, in alternative examples, the bidirectional rule 121 can be defined based on network addresses other than the L3/L4 addresses in the FIG. 1 example, for example, in other embodiments only L2 addresses are used, or only L3 addresses or only L4 addresses are used. Accordingly, the index key section 122 may include address fields other than the fields 124-127 corresponding to network protocols other than L3/L4 network protocols. In addition, the index key section 122 may include fields containing non-address information.

Figures 2A, 2B:
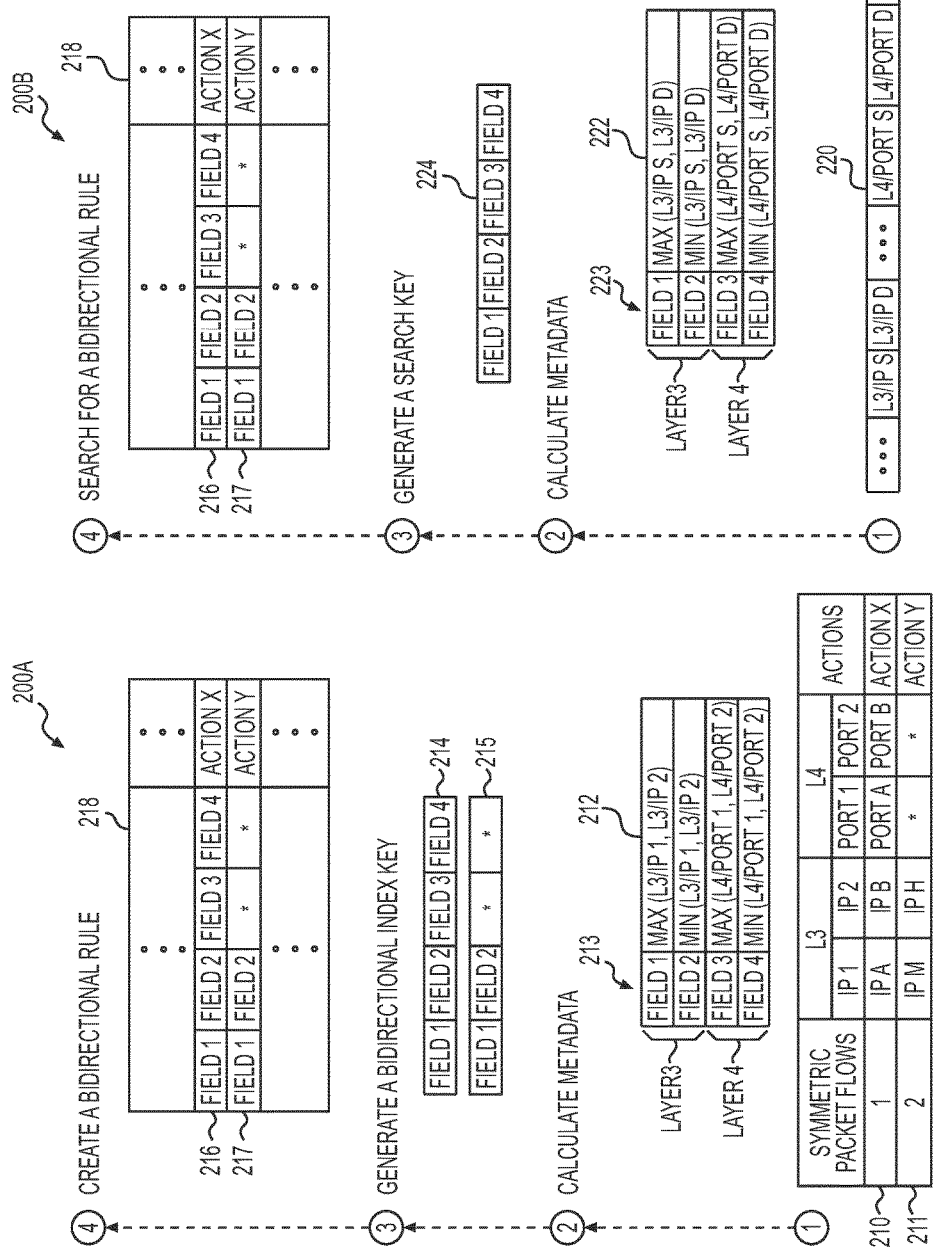
FIG. 2A shows a first process of populating a policy database according to an embodiment of the disclosure.
FIG. 2B shows a second process for searching a policy database according to an embodiment of the disclosure.

FIG. 2A shows a process 200A of populating a policy database 218 according to an embodiment of the disclosure. The process 200A uses the technique for reducing size of a policy database described above. Specifically, the process 200A includes four stages. A canon for generating a bidirectional index key corresponding to stage 2 and 3 is used. At the first stage, parameters for defining two pairs of symmetric packet flows are received. As shown, a first pair of symmetric packet flows 210 is defined using a pair of L3 IP addresses IP A and IP B, and a pair of L4 port addresses Port A and Port B, and an action X is to be executed upon packets belonging to the symmetric packet flows 210. While a second pair of symmetric packet flows 211 is defined using a pair of L3 addresses IP M and IP N regardless of L4 addresses, and an action Y is to be executed upon packets belonging to the symmetric packet flows 211.

At the second stage, two sets of metadata 213 are calculated for each pair of symmetric packet flows 210-211 according to the Max and Min calculation formulas in the MMT 212. For the pair of symmetric packet flow 211, only part of the MMT 212 is used. Specifically, the pair of metadata field 3 and metadata field 4 corresponding to L4 protocol are ignored and not calculated, in an embodiment.

At the third stage, two bidirectional index keys 214-215 are generated for the two pairs of symmetric packet flows 210-211, respectively. Specifically, each bidirectional index key 214-215 includes four fields. Four metadata fields from field 1 to field 4 are included in the bidirectional index key 214. However, for the bidirectional index key 215, only two metadata fields, field 1 and field 2, corresponding to L3 network protocol are included in the first two fields, and wildcard values are included in the last two fields.

At the fourth stage, the two bidirectional index keys 214-215 are associated with the corresponding actions X and Y to create two bidirectional rules 216 and 217 that are subsequently stored in the policy database 218.

FIG. 2B shows a process 200B for searching the policy database 218 according to an embodiment of the disclosure. The policy database 218 used in the FIG. 2A example is searched during the process 200B. In addition, in order to generate a search key, the process 200B uses a canon, represented by the second and the third stages in the process 200B, the same as the canon used in the process 200A. Specifically, the process 200B includes four stages. In the first stage, a packet 220 is received at a network device including a packet processor. The packet 220 includes a pair of L3 source and destination addresses IP S and IP D and a pair of L4 source and destination addresses Port S and Port D.

In the second stage, metadata 223 is calculated for the packet 220 using a MMT 222 similar to the MMT 212 used in the second stage of the FIG. 2A example. Specifically, metadata fields 223 from field 1 to field 4 are calculated based on the L3/L4 addresses in the packet 220 using the same calculation formulas as the metadata fields 213 in the FIG. 2A example.

In the third stage, a search key 224 for the packet 220 is generated in a way similar to the bidirectional index key 214 is generated. Specifically, the metadata fields 223 are included in the search key 224 in an order the same as the metadata 213 in the bidirectional index key 214.

In the fourth stage, the policy database 218 is searched for a bidirectional rule matching the packet 220. Specifically, when comparing the search key 224 with the index key of the entry 216, each field of the search key 224 is compared with each field of the index key of the entry 216. If each field of the search key 224 matches each field of the index key of the entry 216, the bidirectional policy rule 216 is determined to match the packet 220. When comparing the search key 224 with the index key of the entry 217, because the last two fields of the index key of the entry 217 stores wildcard values, a match between the first two fields of the search key 224 and the index key of the entry 216 is suffice to determine a match of the packet 220 to the policy rule 216.

FIG. 2C shows a process 200C of populating a policy database 237 according to an embodiment of the disclosure. The process 200C uses the technique for reducing size of a policy database described above. However, a different type of MMT 233 is used to calculate metadata 234. Specifically, the process 200C includes five stages. A canon for generating a bidirectional index key corresponding to stages 2 through 4 is used. At the first stage, parameters for defining a pair of symmetric packet flows 230 between a first network node and a second network node are received. As shown, the pair of symmetric packet flows 230 is defined using a pair of L3 IP addresses IP A and IP B, and a pair of L4 port addresses Port A and Port B. The L3 IP address IP A and the L4 port address Port A corresponds to the first network node, and the L3 IP address IP B and the L4 port address Port B corresponds to the second network node. An action X is to be executed upon packets belonging to the symmetric packet flows 230.

At the second stage, a first concatenated address and a second concatenated address are generated using expressions 231 and 232, respectively. In the first expression 231, addresses associated with the first network node, the L3 IP address represented as L3/IP 1 and the L4 port address represented as L4/Port 1, are concatenated to form the first concatenated address represented as concatenated address 1 in the expression 231. Similarly, in the second expression 232, addresses associated with the second network node, the L3 IP address represented as L3/IP 2 and the L4 port address represented as L4/Port 2, are concatenated to form the second concatenated destination address represented as concatenated address 2 in the expression 232. In other examples, the order of the addresses in expressions 231 or 232 for the above concatenation operation can be different. For example, in expression 231, positions of address L4/Port 1 and address L3/IP 1 can be switched.

At the third stage, a set of metadata 234 including field 1 and field 2 are calculated for the pair of symmetric packet flows 230 according to the Max and Min calculation formulas in the MMT 233.

At the fourth stage, a bidirectional index key 235 is generated for the pair of symmetric packet flows 230. Specifically, the bidirectional index key 235 includes two fields. The metadata 234 including field 1 and field 2 are included in the bidirectional index key 235.

At the fifth stage, the bidirectional index key 235 is associated with the corresponding action X to create a bidirectional rule 236 that are subsequently stored in the policy database 237.

FIG. 2D shows a process 200D for searching the policy database 237 according to an embodiment of the disclosure. The policy database 237 used in the FIG. 2C example is searched during the process 200D. In addition, in order to generate a search key, the process 200D uses a canon, represented by the second, the third and the fourth stages in the process 200D, that is the same as the canon used in the process 200C. Specifically, the process 200D includes five stages. In the first stage, a packet 240 is received at a network device including a packet processor. The packet 240 includes a pair of L3 source and destination addresses IP S and IP D and a pair of L4 source and destination addresses Port S and Port D.

In the second stage, a first concatenated address and a second concatenated address are generated using expressions 241 and 242 that are similar to the expressions 231 and 232. Specifically, concatenated address 1 is generated by concatenating the L3 source address IP S and the L4 source address Port S, and concatenated address 2 is generated by concatenating the L3 destination address IP D and the L4 destination address Port D.

In the third stage, metadata 244 is calculated for the packet 240 using a MMT 243 similar to the MMT 233 used in the third stage of the FIG. 2C example. Specifically, metadata fields 244 including field 1 and field 2 are calculated based on the concatenated addresses using the MMT 243 including the same calculation formulas as the MMT 233 in the FIG. 2C example.

In the fourth stage, a search key 245 for the packet 240 is generated in a way similar to the bidirectional index key 235 is generated. Specifically, the metadata fields 244 including field 1 and field 2 are included in the search key 245 in an order the same as the metadata 234 in the bidirectional index key 235.

In the fifth stage, the policy database 247 is searched for a bidirectional rule matching the packet 240. Specifically, when comparing the search key 245 with the index key of the entry 246, each field of the search key 245 is compared with each field of the index key of the entry 246. If each field of the search key 245 matches each field of the index key of the entry 246, the bidirectional policy rule 246 is determined to match the packet 240.

In various embodiments, when pairs of destination and source addresses corresponding to more than two network protocols are used to define a pair of symmetric packet flows, the concatenated addresses used in the FIGS. 2C-2D examples can be calculated by concatenating all the source or destination addresses associated with the pair of symmetric packet flows. For example, when layer 2 (L2) addresses are used for defining a pair of symmetric packet flows in addition to the L3 and L4 addresses, a first concatenated address can be calculated by concatenating three destination addresses, specifically, L2, L3, and L4 destination addresses, and a second concatenated address can be calculated by concatenating three source addresses, specifically, L2, L3, and L4 source addresses.

Figure 3:
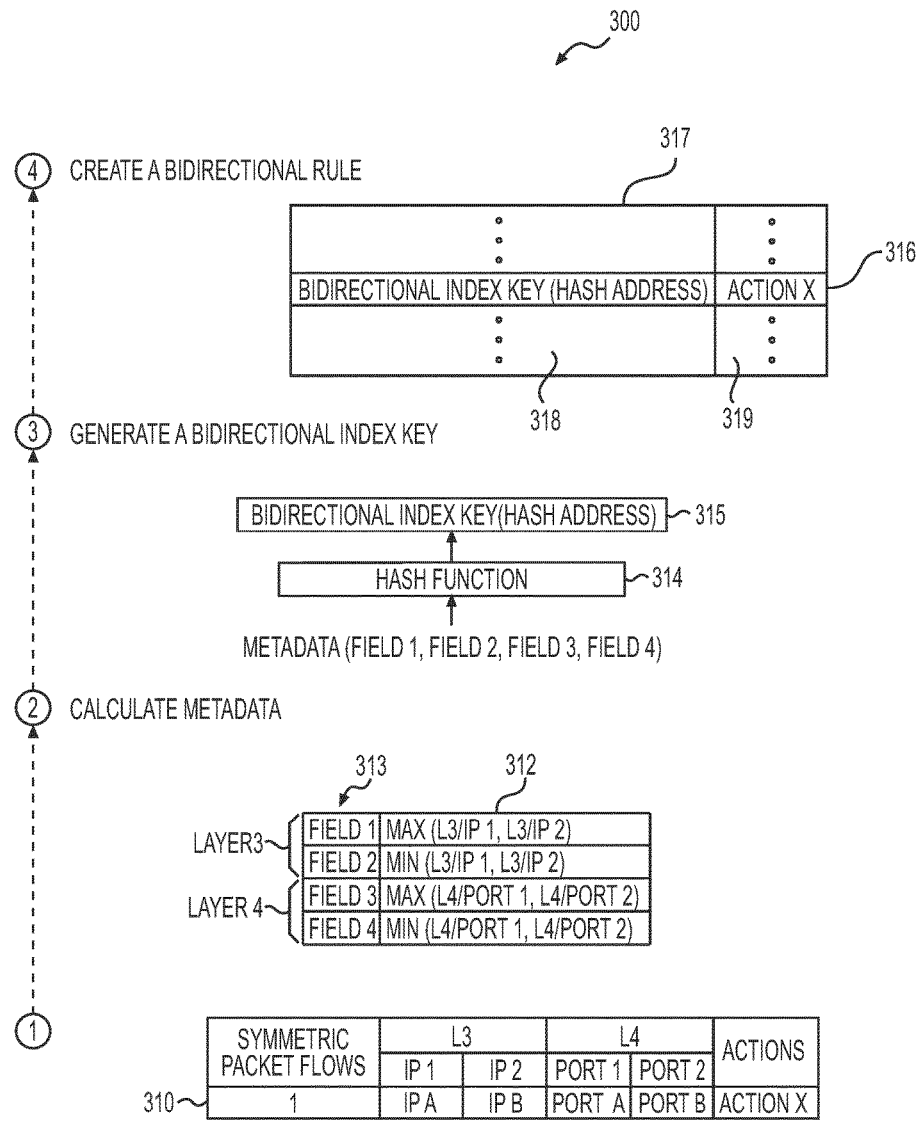
FIG. 3 shows a third process for populating a policy database according to an embodiment of the disclosure.

FIG. 3 shows a process 300 for populating a policy database 317 according to an embodiment of the disclosure. The policy database 317 has a structure similar to the policy database 218 described above, and includes an index key section 318 and an action section 319. However, the policy database 317 is implemented as a hash table and a canon for creating a bidirectional rule in the policy database 317 employs a hash function. Specifically, each entry of the policy database 317 has a hash address as a bidirectional index key at the index key section 318. The hash address is calculated using a hash function 314 and metadata 313. There are numerous hash functions known in the art, but they generally attempt to generate hash addresses, for all data inputs, that are uniformly distributed across an address space such that search in the hash table can have a high performance.

As shown, the process 300 includes four stages. In the first stage, L3/L4 source and destination addresses, IP A/IP B/Port A/Port B, and an action X are provided for defining a pair of symmetric packet flows 310.

At the second stage, metadata 313 representing the addresses of the pair of symmetric packet flows 310 regardless of directions of the symmetric packet flows 310 is calculated. Specifically, the metadata 313 includes four metadata fields 313, from fields 1 to Fields 4, that are calculated using a MMT 312 similar to the MMTs 212/222 described above.

At the third stage, the metadata field values (addresses contained in the metadata fields 313) are used as input data of the hash function 314 to generate a hash address 315. The hash address 315 is to be used as a bidirectional index key for a bidirectional rule 316 defined for the pair of symmetric packet flows 310.

At the fourth stage, the hash address 315 is associated with an action X to create the bidirectional rule 316 that is subsequently stored (inserted) in the policy database 317.

It is noted that when a packet belonging to the pair of symmetric packet flows 310 arrives at a network device where the policy database 317 is being used, a search in the policy database 317 can use a canon that is the same as the canon used in the above policy database populating process 300 for generating a search key. Specifically, the same MMT 312 and the same hash function 314 can be used to generate a hash address that is subsequently used as the search key for searching the policy database 317.

Figure 4:
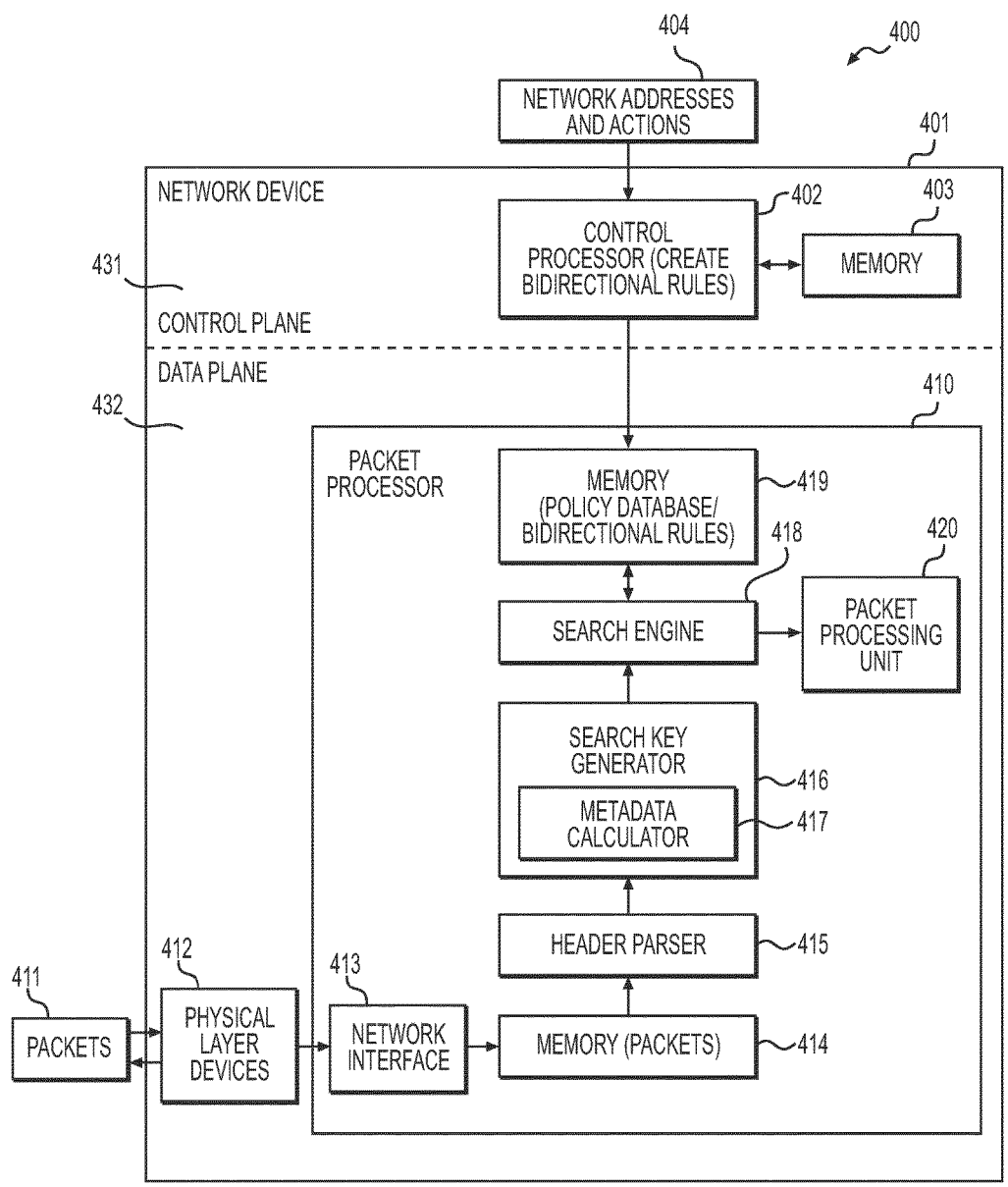
FIG. 4 shows a network device according to an embodiment of the disclosure.

FIG. 4 shows a network device 401 according to an embodiment of the disclosure. The network device 401 includes one or more policy databases. The one or more policy databases implement the technique for reducing size of policy databases described above, and store bidirectional rules defined for pairs of symmetric packet flows. Upon receiving packets 311 from outside networks, the packet device 401 searches the one or more policy databases for a bidirectional rule for each packet, and executes actions associated with a matching bidirectional rule. The network device 401 can be a switch, a router, a firewall, and the like in various embodiments.

Elements and functions of the network device 401 can be logically divided into two parts, referred to as a control plane 431 and a data plane 432. The control plane 431, for example, includes functions such as system configuration and management, routing protocol processing, and the like. The control plane functions are not performed on each individual packet arriving at the network device 401, thus the control plane functions do not have strict processing speed constraint and typically are less time-critical. The data plane 432, for example, includes functions such as lookup operations of routing tables, forwarding tables, and policy databases, and packet processing and forwarding functions. Typically, the control plane functions are performed in a wire speed.

As shown, in an example, the network device 401 includes a control processor 402 and a first memory 403 in a control plane 431, and includes a packet processor 410 and a physical layer device 412 in a data plane 432. The packet processor 410 includes a network interface 413, a second memory 414, such as for example a packet memory for storing packets, a header parser 415, a search key generator 416, a search engine 418, a third memory 419, such as a memory for storing rules (including bidirectional rules) of a policy database, and a packet processing unit 420. The elements described above are coupled together as shown in the FIG. 4.

The control processor 402 is configured to populate a policy database of the network device 401 with at least some rules that are bidirectional. The bidirectional rules are to be selectively applied in a packet processing operation at the packet processing unit 420 to packets received at the network device 401. Specifically, the control processor 402 first receives network addresses and actions 404 for defining a pair of symmetric packet flows and creating a bidirectional rule for the pair of symmetric packet flows. In one example, an interface is provided to a user at the control plane 431, such as web interface provided by a web server running at the control processor 402 or other processor at the control plane. The user logs in to the network device 401 remotely and performs configuration of a policy database. The user inputs network addresses 404, such as L3/L4 source and destination addresses, for defining a pair of symmetric packet flows, and one or more actions to be executed on packets included in the symmetric packet flows.

Subsequently, the control processor 402 generates a bidirectional index key based on a canon. Specifically, in an embodiment, the control processor 420 first calculates a set of metadata based on the network addresses received in the last step. In an example, the metadata includes one or more pairs of metadata fields. Each pair of metadata fields represents a pair of network addresses corresponding to each network protocols regardless of the network addresses being a source address or a destination address. For example, a metadata mapping table (MMT) similar to the MMT 131 in FIG. 1 is used. One of the pair of network addresses with a larger numerical value than the other one of the pair of network addresses is stored in one of the corresponding pair of the metadata fields, and the other one with a smaller numerical value is stored in the other one of the metadata field.

Next, the control processor 402 generates a bidirectional index key based on the metadata calculated in the last step. Based on choices of implementations of storing and searching a policy database, generating the bidirectional index key can adopt different approaches. In an example, the bidirectional index key includes one or more pairs of fields corresponding to the one or more pairs of metadata fields each of which corresponds to a specific network protocol, such as L2/L/3/L4 protocols. Network addresses contained in the metadata fields are populated in the fields of the bidirectional rule, respectively. In addition, in an example, different number of pairs of network addresses, each pair corresponding to a network protocol, is used for defining different pair of symmetric packet flows. When the number of pairs of network addresses used for defining a pair of symmetric packet flows is less than the number of pairs of metadata fields of the MMT, only part of the MMT is used. Accordingly, wildcard values are used in the one or more pairs of fields of the bidirectional index key.

In another example, a policy database is implemented as a hash table. Accordingly, a hash function is used to map addresses in the metadata fields to a hash address, and the hash address is used as a bidirectional index key.

After a bidirectional index key is generated, the control processor 402 creates a bidirectional rule by associating the one or more actions provided by the user with the bidirectional index key. Subsequently, the control processor 402 stores or inserts the created bidirectional rule to a policy database in the data plane 432.

In a further example, a policy database is implemented as a hash table stored in an exact match memory. In an exact search, a search key is compared with an index key in a database bit by bit to determine a match between these two keys. The exact match memory refers to a memory, such as a SRAM, used for implementing a hash table to facilitate exact match search with hashed addresses calculated from a hash function. Generally, when using a hash function to map a set of metadata to a hash address, different sets of metadata may be mapped to a same hash address. Thus, when inserting a bidirectional rule with a hash address to a hash table of a policy database, a collision may happen if the hash address is already been used in the hash table. In order to reduce probabilities of collisions, in an example, a technique is used during an insertion operation of a bidirectional rule. Specifically, one set of metadata is first mapped to multiple hash addresses. By checking the hash table, a hash address from the multiple hash addresses that has not been used by other bidirectional rules is selected. Then, the metadata together with corresponding actions are associated with the selected hash address to create a bidirectional rule. Accordingly, the metadata and the corresponding actions together are inserted to a location corresponding to the selected hash address in the memory.

In various embodiments, the control processor 402 can be implemented using any suitable software, hardware, or combination thereof. In an example, the control processor 402 is implemented using application specific integrated circuit (ASIC), field-programmable gate array (FPGA), and the like. In another example, the control processor 402 is implemented as software program instructions executed on a general purpose processor (GPP).

The first memory 403 stores programs to be executed by the control processor 402 to perform functions described above, and related data, such as network addresses and actions provided by a user.

In the data plane, the physical layer device 412 receives and transmits signals carrying information of packets 411 along links connected to other network nodes in a communication network, and performs physical layer functions, such as converse between optical signals and electrical signals, modulation and demodulation, and the like. In an example, the physical layer device 412 includes one or more physical and/or logical ingress and egress ports connected to the links.

The network interface 413 at the packet processor 410 communicates with the physical layer device 412 and performs link layer functions. Specifically, in an example, the network interface 413 generates packets (or frames) based on signals received from the physical layer device 412 and stores the packets to the second memory 414 for later processing by the packet processor 410. The packets 411 can belong to different packet flows. In addition, the network interface 413 receives packets (or frames) processed in the packet processor 410 and transmits the packets to corresponding specific egress ports at the physical layer device 412 (in form of electric signals).

The header parser 415 reads a packet from the second memory 414, and generates a packet descriptor for the packet. The packet descriptor includes information contained in a packet header of the packet. In an example, the packet header includes multiple header fields corresponding to different network protocols, such as L2/L3/L4 protocols. In an example, the packet descriptor includes one or more pairs of source and destination addresses corresponding to different network protocols. In another example, the packet descriptor includes information in the header fields other than the address fields, and other information, such an identifier of an ingress port. The header parser transmits the packet descriptor to the search key generator 416.

The search key generator 416 generates a search key for the packet based on the one or more pairs of source address and destination address in the packet descriptor of the packet. In addition, the search key generator 416 generates the search key based on a canon similar as the canon for generating an index key used by the control processor 402. Specifically, in an example, to calculate metadata for the packet, the search key generator 416 includes a metadata calculator 417 that uses a MMT the same as the MMT used by the control processor 402 when populating a policy database in the network device 401.

In one example, the control processor 402 generates bidirectional index keys each including multiple fields. Accordingly, based on the metadata of the packet, a search key including multiple fields is generated at the search key generator 416. The search key includes one or multiple fields each containing an address stored in each of the metadata fields of the metadata. In another example, the control processor 402 generates bidirectional keys each including a hash address where a policy database is implemented as a hash table. Accordingly, based on the metadata for the packet, a search key including a hash address is generated at the search key generator 416. The hash address at the search key generator 416 is calculated using the same hash function used at the control processor 402.

The search engine 418 receives the search key of the packet generated at the search key generator 416 and performs a search with the search key in a policy database stored in the third memory 419 for a bidirectional rule matching the packet. In various embodiments, the search on the policy database can be implemented in many different ways.

In an embodiment, the search in the policy database is implemented using programmable algorithms. Accordingly, the memory 419 is a regular memory (relative to TCAM), such as Dynamic Random Access Memory (DRAM), Static Random Access Memory (SRAM), and the like. The search engine 418 is implemented using a general purpose processor (GPP) or an application specific processor (ASP) and executed programs to perform search functions. The algorithms for search the policy database are well known in the arts. Examples include Grid-of-Ties, Hierarchical Intelligent Cuttings (HiCuts), Parallel Bit-Vectors, and the like In another embodiment, some of the bidirectional index keys include fields filled with wildcard values, and the search in the policy database is implemented using TCAM. Accordingly, in an embodiment, the third memory 419 is a TCAM storing multiple entries each corresponding to an entry in the policy database. Each TCAM entry can include 0 and 1 bit values corresponding to network addresses contained in the fields of the bidirectional index key, and don't-care values corresponding to the wildcard values in the bidirectional index key. In an example, the search engine provides a search key to the TCAM. The TCAM outputs one or more addresses associated with TCAM entries that match the input search key. The output addresses point to locations in an associated memory, such as a DRAM or SRAM where actions corresponding to each matched TCAM entry are stored. In an example, the TCAM includes a priority logic circuit that select an output address with highest priority, where priority is ordered by the location of each TCAM entries in the TCAM. Actions with the highest priority are then read form the memory and transmitted to the search engine 418. In another example, actions corresponding to multiple matched TCAM entries are transmitted to the packet processing unit 420. The packet processing unit 420 select actions to be executed according to a preconfigured rule.

In a further embodiment, the policy database is implemented as a hash table, and the search in the policy database is implemented with an exact match memory. In an example, the third memory 419 is used as an exact match memory storing the hash table of the policy database. The search engine 418 receives a search key of a packet that is a hash address. The hash address is calculated from a hash function using metadata calculated by the metadata calculator 417 based on addresses in the packet. The search engine 418 uses the search key (hash address) to determine a location in the hash table of the policy database stored in the third memory 419. At the location, actions associated with a corresponding bidirectional rule matching the packet can be found.

In one example, as described above, the policy database is implemented as a hash table, and the technique that a set of metadata is mapped to multiple hashed addresses to reduce possible collisions was used when populating a bidirectional rule to the hash table at the control processor 402. Accordingly, the search key generator 416 maps the metadata of the packet to multiple hash addresses. Subsequently the search engine 418 applies the multiple hash addresses to the hash table and identifies one or more bidirectional rules corresponding to the multiple hash addresses. Each of the identified bidirectional rules includes a set of metadata and corresponding actions. In case more than one bidirectional rules are identified, the search engine 418 passes the bidirectional rules to the packet processing unit 420. The packet processing unit 420 compares the metadata of the packet with the metadata included in each identified bidirectional rules. One of the identified bidirectional rules having metadata the same as the metadata of the packet is determined to be a bidirectional rule matching the packet. As a result, the actions associated with the matching bidirectional rule are executed.

The packet processing unit 420 receives one or more actions found in the policy database stored in the third memory 419 from the search engine 418 and performs the actions on the packet. In an example, the actions found in the policy database is represented as a link (an address of a memory storing actions), and the link is passed to the packet processing unit 420 from the search engine 418. Accordingly, the packet processing unit 420 uses the link to retrieve the corresponding actions from the memory and subsequently executes the actions.

In various embodiments, the packet processor 410 is implemented using various software, hardware, or combination thereof. In an example, the packet processor 410 is implemented using integrated circuits, such as one or more ASICs, FPGAs, and the like. In another example, the packet processor 410 is implemented using one or more application-specific processors (ASP). In a further example, the third memory 419 is implemented as a memory separated from other elements of the packet processor.

Figure 5:
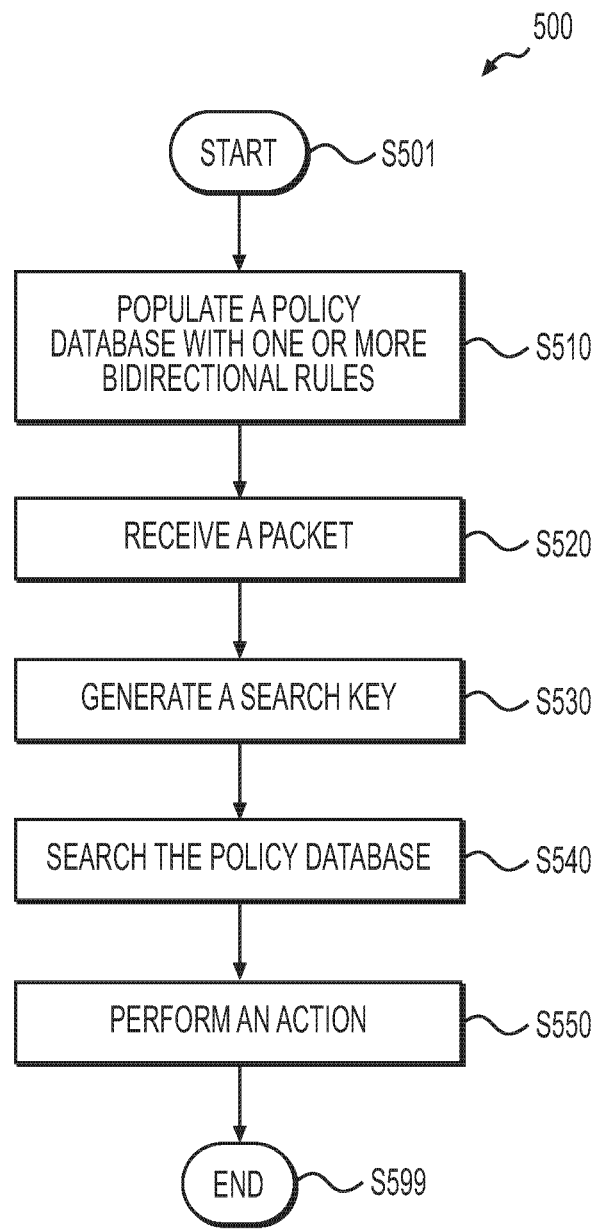
FIG. 5 shows a process for populating and searching a policy database storing bidirectional rules according to an embodiment of the disclosure.

FIG. 5 shows a process 500 for populating and searching a policy database storing bidirectional rules according to an embodiment of the disclosure. The process 500 starts at S501 and proceeds to S510.

At S510, a policy database is populated with one or more bidirectional rules. In an example, one or more pairs of addresses for defining a pair of symmetric packet flows and a set of actions to be executed on packets belonging to the symmetric packet floes are received at a control processor of a network device. The one or more pairs of addresses correspond to different network protocols, such as L2/L3/L4 protocols. Subsequently, an index key is generated using a canon. Specifically, a set of metadata including multiple pair of metadata fields are calculated based on the received one or more pairs of addresses using a MMT. Thereafter, an index key is generated based on the metadata. Subsequently, a bidirectional policy rule is created and stored to a memory. In an example, each bidirectional rule includes an index key section and an action section. In one example, the index key section includes multiple pairs of fields. Each pair of fields holds one of the one or more pairs of network addresses. In another example, the index key section includes a hash address calculated from a hash function using metadata calculated based on addresses defining the pair of symmetric packet flows.

At S520, a packet is received from a network interface of a packet processor in the network device. The packet includes a packet header including multiple pairs of network addresses corresponding to different network protocols in different header fields.

At S530, a search key is generated based on network addresses in the packet header of a received packet using a canon the same as the canon used at S510. Specifically, a set of metadata is calculated based on the network addresses using a MMT the same as the MMT used in the control processor. Thereafter, the search key is generated based on the metadata.

At S540, the policy database is searched with the search key to identify a bidirectional rule matching the packet. In an example, the policy database is stored in a TCAM. In another example, the policy database is stored in an exact match memory implementing a hash table. In an example, after the search operation, a set of actions associated with the bidirectional rule matching the packet is acquired. In another example, multiple bidirectional rules matching the search key is acquired.

At S550, an action associated with a bidirectional rule matching the packet is executed by a packet processing unit in the packet processor. In an example, the set of actions acquired at S540 are performed to the packet. In another example, the packet processing unit first selects a bidirectional rule from the multiple bidirectional rules acquired at S540, and subsequently perform an action associated with the selected bidirectional rule to the packet.

While aspects of the present disclosure have been describe in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method, comprising:

receiving at a network device a first packet belonging to a pair of symmetric packet flows between a first and a second network device, the pair of symmetric packet flows corresponding to a first packet flow and a second packet flow respectively transmitted in opposite directions between the first and the second network device, wherein the first packet has a first source network address and a first destination network address corresponding to the first network device and second network device or vice versa;

generating first metadata for the first packet according to a canon based on the first source network address and the first destination network address such that same metadata is generated for the first packet irrespective of a direction that the first packet is transmitted between the first and second network device, the first metadata including a first address field and a second address field, each of the respective first and second address fields being populated with either one of the first source network address and the first destination network address, respectively, according to the canon;

generating a first bidirectional search key for first packet based on the first metadata;

searching a policy database in the network device using the first bidirectional search key to identify a first bidirectional rule in the policy database corresponding to the first bidirectional search key, the first bidirectional rule including an action or a link to an action that is applicable to the pair of symmetric packet flows between the first and the second network device; and performing the action indicated b the first bidirectional rule on the first packet.

2. The method of claim 1, further comprising:

receiving at the network device a second source network address and a second destination network address of a second packet belonging to the pair of symmetric packet flows;

generating second metadata for the second packet according to the canon based on the second source network address and the second destination network address;

generating a second bidirectional search key based on the second metadata; and populating the policy database in the network device with a second bidirectional rule including the second bidirectional search key.

3. The method of claim 1, wherein generating the first metadata according to the canon includes:

comparing numerical values of the first source network address and the first destination network address of the first packet;

including one of the first source network address and the first destination network address of the first packet that has a larger numerical value in the first address field of the first metadata; and including one of the first source network address and the first destination network address of the first packet that has a smaller numerical value in the second address field of the first metadata.

4. The method of claim 1, wherein the first source network address and the first destination network address of the first packet is a pair of source and destination network addresses corresponding to one of a layer 2 network protocol, a layer 3 network protocol, and a layer 4 network protocol.

5. The method of claim 1, wherein the first packet has a second source network address and a second destination network address corresponding to the first network device and second network device or vice versa, and generating first metadata according to the canon includes:
   concatenating the first and second source network addresses to form a concatenated source network address;
   concatenating the first and second destination network addresses to form a concatenated destination network address;
   comparing numerical values of the concatenated source and destination network addresses;
   including one of the concatenated source and destination network addresses that has a larger numerical value in the first address field of the first metadata; and
   including one of the concatenated source and destination network addresses that has a smaller numerical value in as the second address field of the first metadata.

6. The method of claim 1, wherein generating the first bidirectional search key based on the first metadata includes:
   generating a hash address to be the first bidirectional search key with a hash function based on the first metadata.

7. The method of claim 1, wherein the policy database is stored in a ternary content-addressable memory (TCAM) device or an exact match memory device.

8. A network device, comprising a packet processor configured to:
   receive at a network device a first packet belonging to a pair of symmetric packet flows between a first and a second network device, the pair of symmetric packet flows corresponding to a first packet flow and a second packet flow respectively transmitted in opposite directions, wherein the first packet has a first source network address and a first destination network address corresponding to the first network device and second network device or vice versa;
   generate first metadata for the first packet according to a canon based on the first source network address and the first destination network address such that same metadata is generated for the first packet irrespective of a direction that the first packet is transmitted between the first and second network device, the first metadata including a first address field and a second address field, each field being populated with either one of the first source network address and the first destination network address, respectively, according to the canon;
   generate a first bidirectional search key for first packet based on the first metadata;
   search a policy database in the network device using the first bidirectional search key to identify a first bidirectional rule in the policy database corresponding to the first bidirectional search key, the first bidirectional rule including an action or a link to an action that is applicable to the pair of symmetric packet flows between the first and the second network device; and
   perform the action indicated by the first bidirectional rule on the first packet.

9. The network device of claim 8, further comprising a control processor configured to:
   receive at the network device a second source network address and a second destination network address of a second packet belonging to the pair of symmetric packet flows;
   generate second metadata for the second packet according to the canon based on the second source network address and the second destination network address;
   generate a second bidirectional search key based on the second metadata; and
   populate the policy database in the network device with a second bidirectional rule including the second bidirectional search key.

10. The network device of claim 8, wherein the packet processor is configured to:
   compare numerical values of the first source network address and the first destination network address of the first packet;
   include one of the first source network address and the first destination network address of the first packet that has a larger numerical value in the first address field of the first metadata; and
   include one of the first source network address and the first destination network address of the first packet that has a smaller numerical value in the second address field of the sequence of at least two fields of the first metadata.

11. The network device of claim 8, wherein the first source network address and the first destination network address of the first packet is a pair of source and destination network addresses corresponding to one of a layer 2 network protocol, a layer 3 network protocol, and a layer 4 network protocol.

12. The network device of claim 8, wherein the first packet has a second source network address and a second destination network address corresponding to the first network device and second network device or vice versa, and the packet processor is configured to:
   concatenate the first and second source network addresses to form a concatenated source network address;
   concatenate the first and second destination network addresses to form a concatenated destination network address;
   compare numerical values of the concatenated source and destination network addresses;
   include one of the concatenated source and destination network addresses that has a larger numerical value in the first address field of the first metadata; and
   include one of the concatenated source and destination network addresses that has a smaller numerical value in the second address field of the first metadata.

13. The network device of claim 8, wherein the packet processor is configured to:
   generate a hash address to be the first bidirectional search key with a hash function based on the first metadata.

14. The network device of claim 8, further comprising:
   a memory configured to store the policy database, the memory being one of a ternary content-addressable memory (TCAM) and an exact match memory.

* * * * *